Figure 1:
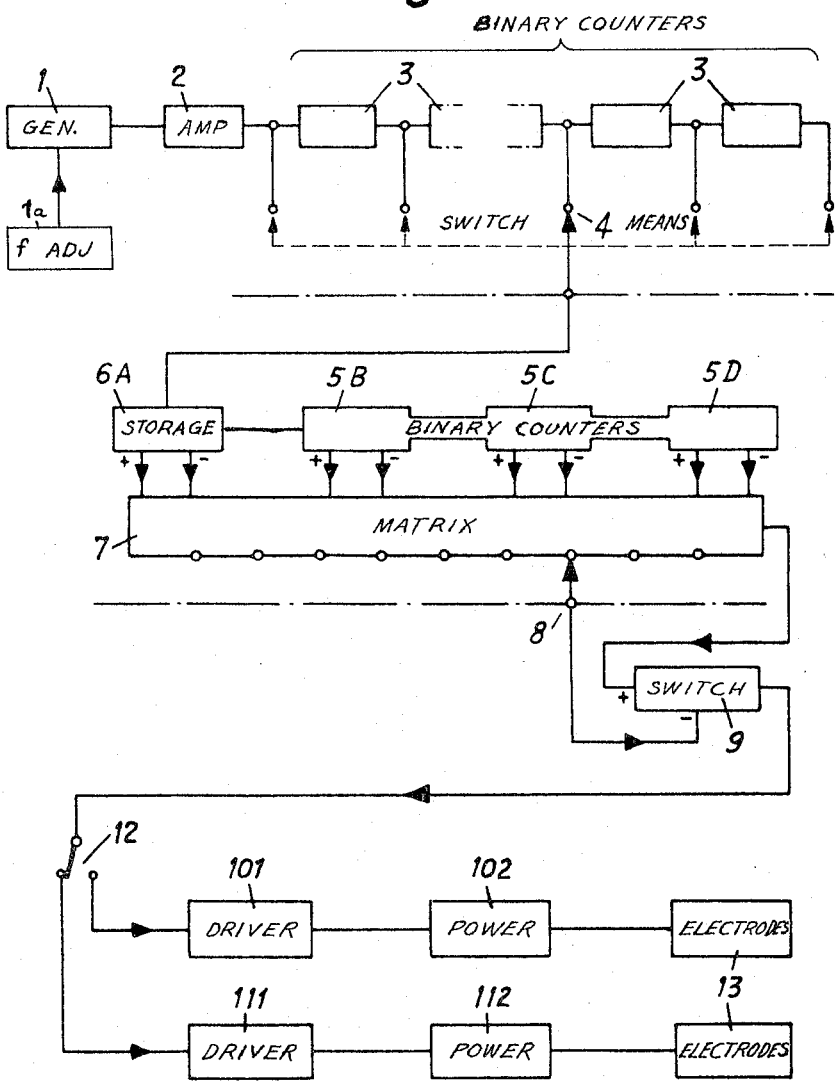

INVENTORS:
Werner Ullmann &
BY Franco Donati
Werner W. Kleeman
ATTORNEY

United States Patent Office 3,264,517
Patented August 2, 1966

3,264,517
GENERATOR FOR ELECTRO-EROSION
METAL WORKING
Werner Ullmann, Locarno-Orselina, and Franco Donati, Locarno, Switzerland, assignors to A.G. für Industrielle Elektronik AGIE, Losone-Locarno, Switzerland, a corporation of Switzerland
Filed Oct. 7, 1963, Ser. No. 314,144
Claims priority, application Switzerland, Oct. 12, 1962, 12,015/62
12 Claims. (Cl. 315—174)

The present invention relates to an improved generator for electro-erosion metal working which is controllable for different pulse ratios with variable pulse repetition frequencies.

The electro-erosion working of metals is always gaining more and more importance in the field of metal removal or machining. In contradistinction to the customary mechanical metal working techniques, the optimum working efficiency with electro-erosion machining is dependent upon the following factors:

(1) Workpiece material and electrode material,
(2) The fluid employed in the gap,
(3) The electric parameters such as current, voltage and energy, in particular their shape, amplitude, width, interpulse pause, relation or ratio between pulse width and interpulse pause or "duty cycle," and the pulse-repetition frequency.

In order to be able to carry out the desired working techniques such as roughing, initial or first-polishing and fine-finishing while taking into consideration the dimensions of the piece to be machined and to achieve as small as possible wear of the electrode tool, it is particularly necessary to be able to freely select and adjust the parameters described above under item 3. In the previously known generators all of these factors could not be selected free and independent of one another, so that it was necessary to be satisfied with smaller material removal efforts and larger electrode wear.

Accordingly, it is a primary object of the present invention to provide an improved generator which in addition to permitting adjustment of the working pulse amplitude and shape, also permits adjustment of the pulse width, interpulse pause or "duty cycle," and the pulse-repetition frequency independent of one another.

Generally speaking, the aforementioned object is achieved according to the teachings of the present invention by providing, in combination, an electro-erosion machine having an erosion gap and means for providing output pulse trains with different pulse width ratios across the gap, with the means for providing the output pulse trains comprising generator means for producing an input pulse train, means for receiving the input pulse train and converting the same into a plurality of pulse trains each having different frequencies, controllable switching means responsive to control signals for producing across the gap output pulse trains of constant frequency and variable pulse width, and control means electrically coupled with the converting means and the controllable switching means. The control means includes a matrix for selectively combining the plurality of pulse trains and producing control signals therefrom which are fed to the controllable switching means to vary the output pulse width in accordance with the control signals. In this manner, there is provided a versatile generator which permits diverse electro-erosion metal machining applications.

Still further objects and the entire scope of applicability of the present invention will become apparent from the detailed description given hereinafter; it should be understood, however, that the detailed description and specific examples, while indicating a preferred embodiment of the invention, is given by way of illustration only, since various changes and modifications within the spirit and scope of the invention will become apparent to those skilled in the art from this detailed description.

Figure 2:
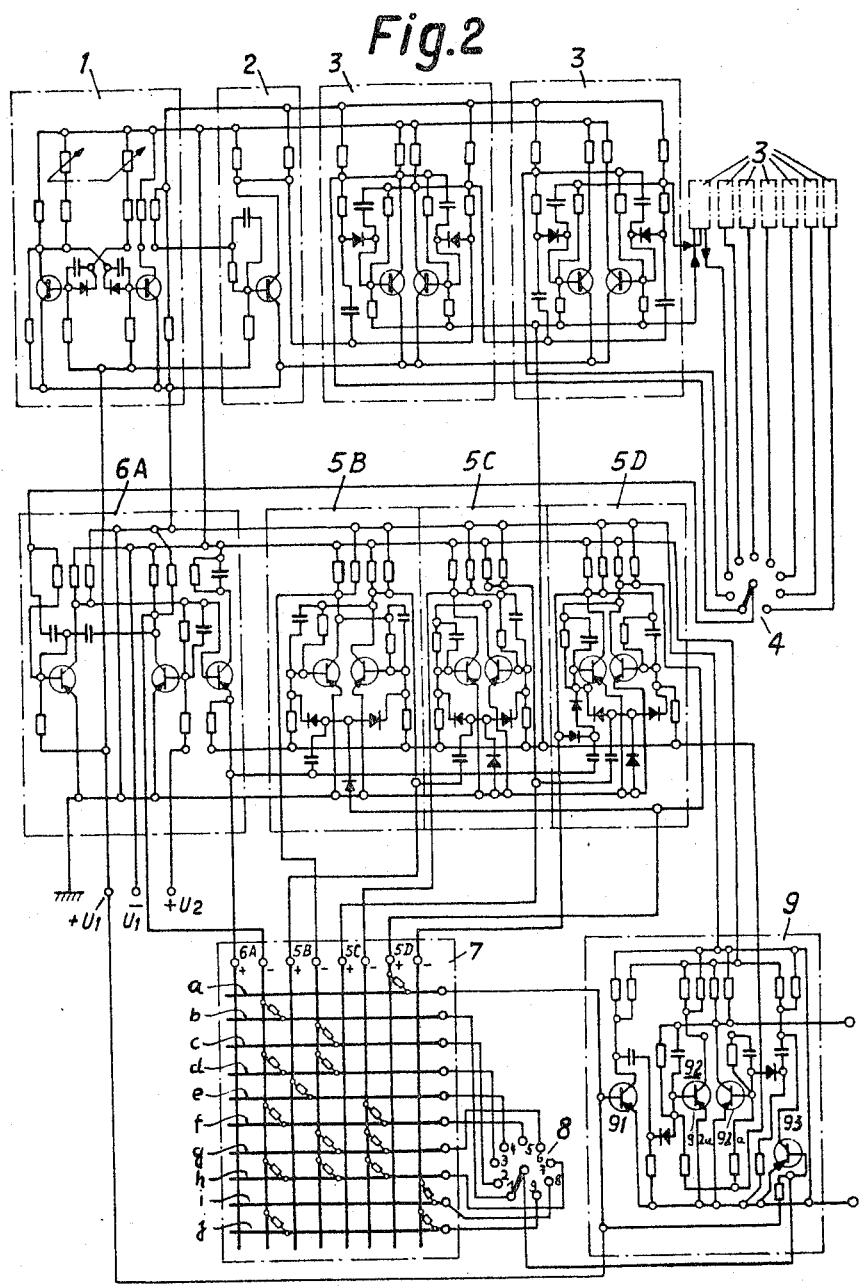
Figure 3:
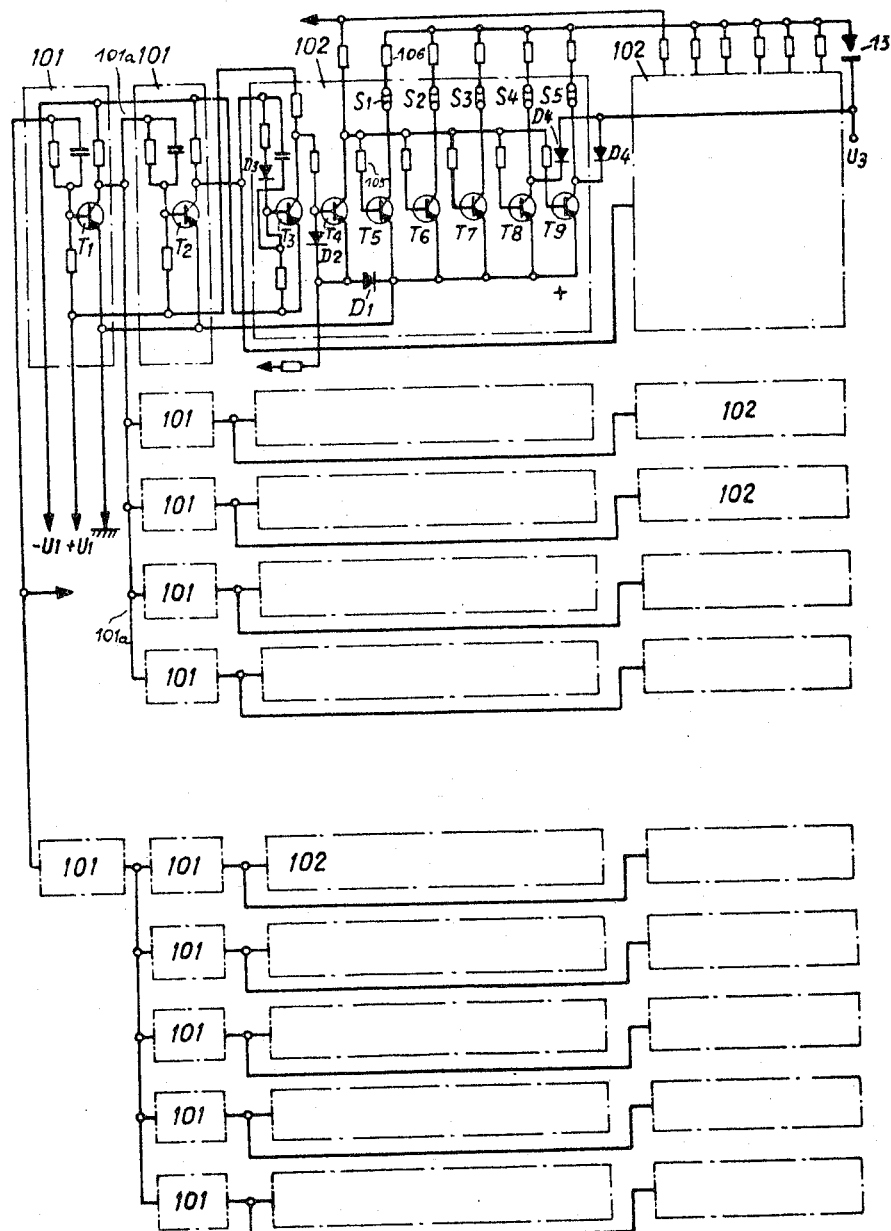
Figure 4:
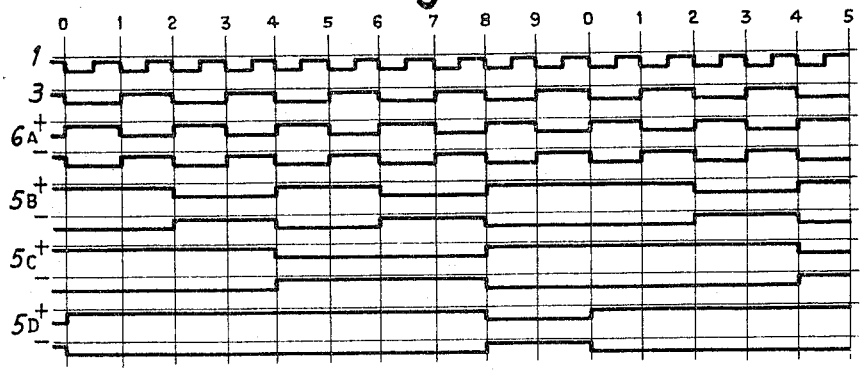
Figure 5:
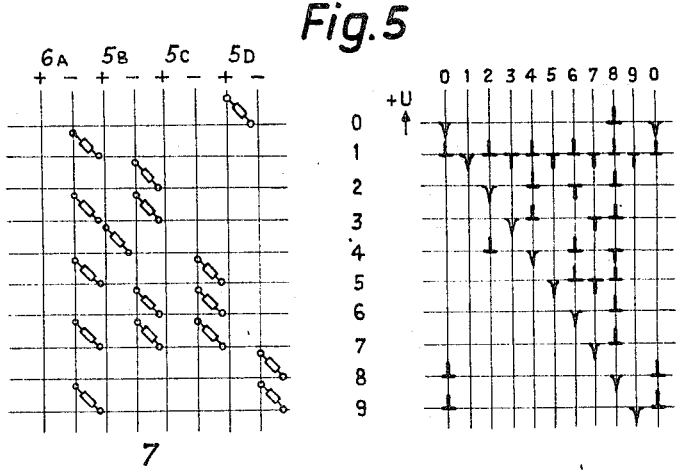
Figure 6:
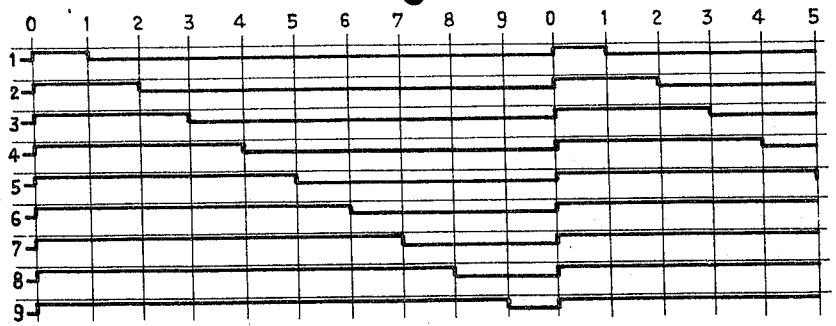

In the drawings:
FIGURE 1 is a block diagram of an electro-erosion system constructed in accordance with a preferred embodiment hereof;
FIGURE 2 illustrates in detail preferred circuit arrangements of the system of FIGURE 1 without the power output circuitry;
FIGURE 3 illustrates in detail the preferred power output circuitry of the system of FIGURE 1; and,
FIGURES 4, 5 and 6 are illustrative graphic diagrams of pulses and signals appearing at various points in the system of FIGURE 1.

Describing now the drawings, it will be seen that in the block diagram of FIGURE 1 there is illustrated a transistorized multivibrator 1 which serves as a generator means for providing an input pulse train. The multivibrator 1 is provided with a continuous adjustment means, generally designated by reference numeral 1a, for adjusting the input pulse train frequency. A standard amplifier 2 receives and amplifies the input pulse train. Binary counters are arranged as frequency dividers or reduction stages 3 at the output of amplifier 2 and serve as means for receiving the input pulse train and converting the same into a plurality of pulse trains, each having different lower frequencies. The desired reduced or stepped-down frequency is removed from the frequency reduction stages 3 by means of the switch means 4, and feeds to a storage means 6A. Feedback or back-coupled binary counters 5B, 5C, 5D are coupled to the storage means 6A so as to provide further inputs for a matrix 7 described more fully below.

The circuit is so constructed and arranged that the matrix 7 receives inputs from storage means 6A and counters 5B, 5C and 5D. The matrix is, for example, a resistance matrix, receiving various pulse trains of different frequencies and/or pulse widths. The matrix selectively combines the various pulse trains and produces control signals therefrom. Switch means 8 permits selection of the desired control signal as an output from the matrix. The subsequent arranged switching stage 9 is responsive to the selected control signal for providing an erosion control pulse train and consists of differentiating circuit members 91, 93 and a two-condition or bistable trigger circuit 92. This switching stage 9 is electrically coupled with a power output circuit including the power output stages 101, 102 for low frequencies and with the power output stages 111, 112 for high frequencies. These aforesaid power output stages feed the erosion gap 13.

The stages 101 and 111 are designated as drivers and the stages 102 and 112 are the actual power transistor assembly or pack. According to the employed electronic circuit components the same drivers 101, 111 and the same power transistor assembly or pack 102, 112 can operate for the entire frequency range, for example, from 0.5 to 500 kilocycles per second, upon the erosion gap 13. In other words, it does not make any difference which type of transistors are employed, whether for low frequencies and high current or for high frequencies and low current, since these stages 101, 111, 102 and 112 provide wideband amplifiers. They work mainly without transformers. Particular importance is placed upon non-use of inductive or capacitive members, rather ohmic or resistive members.

In FIGURE 2, circuit elements or components 1–9 are shown and the same reference numerals have been again employed for like elements or components. Since the transistor circuits for the circuit components 1–9 are of themselves known to the art no further discussion thereof will be undertaken.

In FIGURE 3 there is illustrated the transistorized driver 101 and power transistor packs 102, wherein only at the uppermost row are the individual constructional elements illustrated, such as transistors T1–T9, the diodes D1–D4, the resistors, the capacitors, and the protective or safety fuses S1–S5. The erosion gap 13 is likewise only symbolically illustrated. In known manner, the different transistors are arranged in parallel, and indeed such that the transistor T1 supplies five transistors T2 via lead 101a, wherein each transistor T2 supplies two main groups of five respective transistors T5–T9. The aforementioned transitor assembly is advantageously arranged in a well known cascade circuit. The driver 101 and the power output stage 102 of FIGURE 3 are thus only designed for low frequencies. The driver 111 and power stage 112 designed for high frequencies, for convenience are not illustrated since they are dimensioned in the corresponding manner as in FIGURE 3.

FIGURE 4 is a diagram of pulses such as arrive at the resistance matrix 7 from the storage means 6A and from the binary counters 5B, 5C, 5D. The pulse diagram is divided in the horizontal direction into ten time periods from 0–9 since ten periods are standard in the art. In the vertical direction, that is along the ordinate, the pulses of the multivibrator 1 are shown at the top of the aforesaid diagram. At the next step, pulses which arrive at the storage means 6A via the switch 4 from stage 3 are shown. Additionally, the pulses arriving at the resistance matrix 7 from the storage means 6A and the binary counters or reduction stages 5B, 5C, 5D are shown and designated by corresponding numerals.

FIGURE 5 illustrates in diagram form the differentiated pulses which arrive at the bistable trigger circuit 92 of switching stage 9. The differentiation of the output of stages 5 for providing operating pulses is undertaken at the differentiation circuit 91 and the differentiation of the matrix output for providing cut-off or extinguishing pulses at the differentiation circuit 93. Thus, frequency control of the output is basically determined by binary counter stages 5 directly and the output of these stages 5 is dependent on adjustment of switch 4. On the other hand, the cut-off time or pulse width ("duty cycle") is basically determined by the output selected from matrix 7.

The pulse diagram illustrated in FIGURE 5 divided into ten time periods from 0–9 in the horizontal direction, that is along the abcissa. In the vertical direction there is illustrated the ten swiching positions or steps, whereby the switching position "0" depicts the making or operating pulses from stages 5 via the resistance matrix 7 at the differentiation circuit 91, and the switching positions 1–9 the extinguishing pulses from the aforesaid matrix 7 appearing at the differentiation member 93 via the control switch 8. In order to enhance comprehension of this pulse diagram of FIGURE 5 the resistance matrix 7 is depicted alongside at the left thereof.

FIGURE 6 illustrates a diagram of those pulses which arrive from the bistable trigger circuit 92 as output pulses at the driver 101, 111 and the power output stages 102 or 112 respectively, via the switch 12. This diagram in the horizontal direction is again divided into ten time periods and in the vertical direction there is depicted the switch positions from 1–9 of the control switch 8 for the resistance matrix 7. According to the switching position of this control switch 8 it is possible to obtain an appropriate or corresponding pause width ("duty cycle") relationship or ratio.

The mode of operation of the system is as follows:

The pulse output of the astable multivibrator 1 with a frequency of, for example, one megacycle per second, are amplified in the amplifier 2 and are stepped down or reduced in frequency in the frequency reduction stages 3 in a 2:1 ratio for example. The astable multivibrator 1 can undertake a continuous frequency regulation, whereas the frequency reduction stages 3 can only reduce in a ratio of 2:1. Thus, it is possible to undertake a fine regulation with the continuous frequency regulation 1a and to remove at the frequency reduction stages 3 the corresponding reduced frequency ratio of 2:1. In this manner, one is able to obtain every possible frequency which is necessary for the electro-erosion metal working or machining.

By means of the adjustment switch 4 the desired frequency is regulated and delivered to the storage means 6A. The three back-coupled or feedback binary counter or reduction stages 5B, 5C, 5D, in turn generate pulses wherein, on account of such feedback, the frequency is variable, corresponding to the pulse diagram of FIGURE 4. Since the same signal always appears in a flip-flop at both of the collectors of the transistors, however 180° out of phase, this difference is depicted in the pulse diagram of FIGURE 4 with signs of plus (+) and minus (—). The pulses depicted in FIGURE 4 for the storage means 6A and for the binary counter or reduction stages 5B, 5C, 5D arrive at the subsequently coupled or arranged resistance matrix 7. The resistance matrix 7 of FIGURE 2, as well as also of FIGURE 5, is correspondingly divided into vertical inputs +6A—, +5B—, +5C—, +5D—. The horizontal outputs b–j of the resistance matrix 7 are coupled with nine contacts "1–9" of the control switch 8 (see FIGURE 2). With a specific switch position of the control switch 8, one given output of the resistance matrix 7 is directly connected to the differentiation circuit 93 of the switching stage 9. The selected transposition points or crossings of the resistance matrix 7 between the aforesaid respective inputs and outputs of the same are connected, by way of example, with one another via ohmic resistors. From the large number of transposition points it is possible to select a specific control signal for the desired output pulse width. Thus, there can be connected to one output an input, as such for example is the case with input 6A— and the output "b" for switch position "1" of the control switch means 8. It is also possible to connect two or more inputs with one output, as such is illustrated for example with the inputs 6A—, 5B—, 5C—, and output "h" for switch position "7." With the nine switching positions "1–9" of the control switch 8 it is therefore possible to select a corresponding output b to j of the resistance matrix 7, and to couple such with the differentiation circuit 93 of the switching stage 9. In accordance with two examples discussed hereinafter there will be more specifically described how a selection of pulses is made which emanate from the supply means 6A and the reduction stages 5B, 5C, 5D.

*Example 1*

With the position of the control switch 8 shown in FIGURE 2, i.e., at switch position "1" the pulses from the storage means 6A arrive via input 6A—, the corresponding crossing point, the output "b," and the control switch 8, at the differentiation circuit 93 of the switching stage 9. The corresponding pulse repetition can be seen in FIGURE 4 at the location of the ordinate marked 6A—, since in this example the input 6A— of the resistance matrix (FIGURE 2) is correspondingly wired or placed in circuit. This aforesaid pulse repetition arrives at the differentiation circuit 93. There it is differentiated in accordance with FIGURE 5, as shown at the switch position "1" appearing along the ordinate of such figure. Only the first negative pulse edge after the operating or making pulse is utilized. Such is depicted in FIGURE 5 in that the making or operating pulses and the extinguishing pulses, are shown at the repective horizontal reference line for the ten switching positions "0–9," directed downwardly in the form of differentiated pulses.

Example 2

In the event that the arm of the control switch 8 is switched three steps to the right, then such has reached the switch position "7" for the output "h" of the resistance matrix 7. The three inputs 6A—, 5B—, 5C— are connected via resistors with this aforesaid output "h." The pulse repetition is illustrated in FIGURE 4 at the correspondingly designated horizontal sections 6A—, 5B—, 5C—, of such diagram. The three pulses arrive in this form at the differentiation circuit 93. Since the three pulses are added the differentiation circuit 93 is first influenced or affected at time period "7." The pulse which arrives at the bistable trigger circuit 92 from the differentiation member 93 is shown in FIGURE 5 at the switch position "7."

The pulses mentioned in both of the aforedescribed examples are only extinguishing pulses for the bistable trigger circuit 92 of the switching stage 9 of FIGURE 2. The operating or making pulse is permanent or established. Namely, such is generated in the reduction stage 5D and is applied directly to the differentiation circuit 91 of the switching stage 9 via the input 5D+, resistance matrix 7, and through output "a." The pulse form is illustrated in FIGURE 4 at the location marked 5D+. Only the pulse edge or flank at time period "0" is utilized in the aforesaid differentiation circuit; see FIGURE 5 depicting one start pulse command at switch position "0." Only at time period "0" is the operating or making pulse effective upon the bistable trigger circuit 92. This means that the bistable trigger circuit 92 is controlled at time period "0" such that it delivers a pulse and according to the principles or workings of the aforementioned extinguished pulses in the time periods "1" or "2" or "3" . . . and so forth or "9" terminates this pulse. Such is depicted in FIGURE 6 for all switch positions "1–9." The hereinmentioned first example (switch position "1") thus has an interpulse pause relationship or ratio i.e., pulse width to pulse pause or duty cycle of 1:9 and the second example (switch position "7") an interpulse pause relationship or duty cycle of 7:3. FIGURE 6 shows that it is thus possible to achieve duty cycles from 1:9 to 9:1. These different ratios have been obtained without having to change the working pulse recurrence or repetition frequency. At the time period "0" there is always the beginning of a new pulse.

The pulse shapes depicted in FIGURE 6 then arrive at the driver 101 and power output stage 102 of the power output circuit of FIGURE 3, there are appropriately amplified in consequence of the parallel connection of the cascade transistor arrangement, so that there is sufficient power or energy present at the erosion gap 13 for performing the desired electro-erosion machining operation.

With regard to the circuit of FIGURE 3, it should here further be mentioned that the transistors which operate upon the erosion gap 13 are appropriately protected. For the proper blocking of the transistors T5–T9 there is provided a diode D1 connected in forward direction. There is always applied to such diode +0.8 volt. This voltage is applied via the transistor T4 always to the base of the transistors T5–T9 when these transistors block. The diode D2 is provided in order that the voltage between the base and the emitter of the transistor T4 can be maintained constant. All of the transistors T5–T9 are provided with a resistor 105 at their base electrode or lead which serves as a balance for the base-emitter path. The transistors also have a respective resistor 106 arranged in the collector circuit which serves as the balance for the collector-emitter path and as protective resistance for the transistors. These resistors limit the short circuit current so that the transistors cannot be damaged. Finally, each output transistor T5–T9 is provided with a normal protective or safety fuse S1–S5 in its collector circuit. If any one of the transistors T5–T9 should become damaged then it draws direct current. However, the safety fuse then becomes activated and cuts-out the defective transistor. Therefore, the generator can continue its operation.

On the basis of the damaged safety fuse it is easy to determine and replace the defective transistor. The diodes D4 which are shown arranged between the collector circuit of the transistors T5–T9 and the erosion gap 13 protect the transistor with interrupted arc. These diodes provide a shunt. Upon interruption of the arc the inductivity formed by the lead-in cable or line and the machine produces an oppositely directed voltage. Such overload or excessive voltage is withdrawn via the diode D4. Moreover, the diodes must be capable of operating at least as quickly as the transistors because the excessive voltage can then still destroy the transistor.

In addition to the previously described possibilities for the generator during electro-erosion machining there are still further advantages. It is readily possible that the pulses arriving at the erosion gap 13 are changed in polarity, for example, by changing the polarity of the voltage between electrode and workpiece. A change of the amplitude of the pulses at the erosion gap 13 can be undertaken by changing the direct current voltage applied to the erosion gap. With the inventive generator one is not limited to rectangular shaped pulses. By the use of appropriate multivibrators or so-called impulse or pulse shaper elements it is possible to achieve sinusoidal-shaped pulse forms or other pulse forms. Likewise, the pulse shape can be changed through the servo-control of the tool machine with which the generator works. By increasing or reducing the spacing between electrode and workpiece, it is possible to influence the desired time period for the arcing-over as well as its extinguishment.

While there is shown and described a present preferred embodiment of the invention, it is to be distinctly understood that the invention is not limited thereto but may be otherwise variously embodied and practiced within the scope of the following claims.

Having thus described the present invention, what is desired to be secured by United States Letters Patent, is:

1. In combination:
    (a) an electro-erosion machine having an erosion gap, and
    (b) means for providing output pulse trains with different pulse width ratios across said gap, said means comprising:
        (1) generator means for providing an input pulse trains;
        (2) means for receiving said input pulse train and for converting said input pulse train into a plurality of pulse trains each having different frequencies;
        (3) controllable switching means responsive to control signals for producing across said gap output pulse trains of constant frequency and variable pulse width; and
        (4) control means electrically coupled with said converting means and said controllable switching means, said control means including a matrix for selectively combining said plurality of pulse trains and producing control signals therefrom fed to said controllable switching means to vary said output pulse width in accordance with said control signals.

2. The combination defined in claim 1 wherein said control means further includes switching means selectively connectable with any one of said plurality of different frequency pulse trains, said controllable switching means being connected therewith for adjustment of said constant frequency of said output pulse trains.

3. The combination defined in claim 1 wherein said generator means includes means for continuously adjusting the pulse repetition frequency of said input pulse train, and wherein said means for receiving and converting comprises binary counters arranged as frequency dividers at the output of said generator means.

4. The combination defined in claim 1 wherein said means for receiving and converting comprises feedback binary counters.

5. The combination defined in claim 1 wherein said control means comprises a resistance matrix and switch means for selecting the control signals fed therefrom.

6. The combination defined in claim 5 wherein said resistance matrix includes means for converting the output thereof into a starting signal and an extinguishing signal of predetermined interval therebetween, and wherein said controllable switching means is responsive to said starting signal and said extinguishing signal.

7. The combination defined in claim 6 wherein said controllable switching means comprises differentiation circuit and bi-stable trigger circuit.

8. The combination defined in claim 7 and further including a power output circuit coupled between said controllable switching means and said gap and comprising a plurality of transistor circuit means connected in parallel and disposed in cascade arrangement.

9. The combination defined in claim 8 wherein said transistor circuit means includes a transistor having base emitter and collector electrodes, and wherein each said transistor circuit means further includes diode means and resistor means arranged in the base emitter circuit of the transistor thereof and safety fuse means and diode means arranged in the collector circuit thereof for protecting the transistor.

10. The combination defined in claim 9 wherein said power output circuit further includes driver means to actuate said transistor circuit means, said transistor circuit means being directly connected between said driver means and said erosion gap.

11. The combination defined in claim 7 wherein said differentiation circuit includes two differentiation circuit components, said bistable trigger circuit having two inputs, one input of said bistable trigger circuit being coupled with one of said differentiation circuit components for receiving said starting signal, the other input of said bistable trigger circuit being coupled with the other differentiation circuit component for receiving said extinguishing signal.

12. The combination defined in claim 1 wherein said control means includes selector switching means and said matrix comprises a resistance matrix having a plurality of outputs, wherein said controllable switching means comprises a switching circuit including at least two inputs, and wherein one output of said resistance matrix is connected directly with one input of said switching circuit and the other outputs of said resistance matrix are connected through said selector switching means to the other input of said switching circuit.

No references cited.

JOHN W. HUCKERT, *Primary Examiner.*

D. J. GALVIN, *Examiner.*

D. E. PITCHENIK, D. O. KRAFT,
*Assistant Examiners.*